Aug. 31, 1965

L. HANNAUER 3,203,505

TRANSMISSION MECHANISM

Filed June 6, 1963

Inventor
Louis Hannauer
By Thomas F. Kirby
Attorney

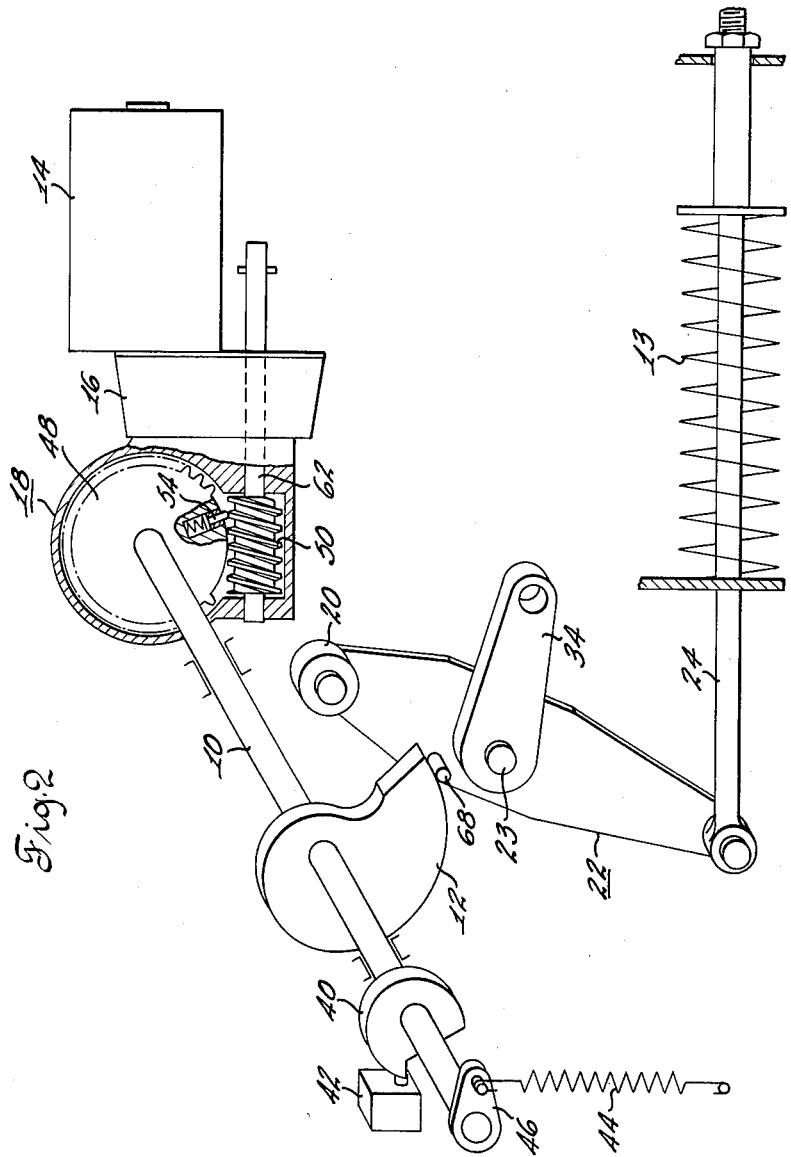

United States Patent Office 3,203,505
Patented Aug. 31, 1965

3,203,505
TRANSMISSION MECHANISM
Louis Hannauer, Boston, Mass., assignor to
Allis-Chalmers, Milwaukee, Wis.
Filed June 6, 1963, Ser. No. 286,017
3 Claims. (Cl. 185—40)

This invention relates generally to transmission mechanisms and particularly to those employed in contact operating mechanisms of electric circuit breakers, although it is not so limited.

In some electric circuit breakers, for example, the contact operating mechanism employs stored energy means, such as a spring, which can be charged and then discharged to operate the circuit breaker contacts. The spring is charged by an electric motor which is connected thereto through a transmission mechanism and other linkage. In operation, the motor begins to operate immediately upon discharge of the spring and is deenergized as soon as the spring is fully recharged. However, because of the tendency of the motor to overtravel after it is deenergized, means must be provided to prevent motor overtravel from being transmitted through the transmission mechanism and the other linkage to the spring.

In accordance with the present invention there is provided an improved transmission mechanism comprising a spiral worm driven by the motor and a worm wheel gear for meshing engagement with the worm. The periphery of the gear has a portion provided with continuous teeth and has another portion without teeth. That portion of the gear without teeth is provided with means, such as a depressible spring biased plunger, for camming the gear and worm into proper meshing relationship. The gear is affixed to a shaft, and means such as a cam is affixed to the shaft for charging the circuit breaker closing spring when the gear is rotated. Means are provided to move the gear into engagement with the worm at the beginning of each cycle of cooperative movement, i.e., upon discharge of the spring. Such discharge also effects operation of the motor to cause the worm to drive the gear thereby causing rotation of the cam which recharges the spring. When the spring is fully recharged, the motor becomes deenergized. However, at that point, the toothed portion of the gear has disengaged the worm. Therefore, motor overtravel is not transmitted to the gear and the circuit breaker operating mechanism is ready for repetition of the cycle disclosed above.

It is an object of this invention to provide a new and improved transmission mechanism.

Another object is to provide a new and improved gear and gearing arrangement therein.

Another object is to provide a transmission mechanism employing a spiral worm and a worm wheel gear having teeth along one portion of its periphery but none along another portion, said gear having a depressible member for engaging the spiral worm to cam the spiral worm into proper relationship with the teeth of the gear.

Another object is to provide a transmission mechanism of the aforesaid character wherein the depressible member comprises a spring biased plunger which is depressible into a hole on the periphery of the worm wheel gear.

Another object is to provide a new and improved contact operating mechanism for an electric circuit breaker.

Another object is to provide improved means for recharging of the contact operating spring of an electric circuit breaker.

Other objects and advantages of the invention will hereinafter appear.

The drawings illustrate a preferred embodiment of the invention but it is to be understood that the embodiment illustrated is susceptible of modifications with respect to details thereof without departing from the scope of the appended claims.

In the drawings:

FIG. 2 is a simplified perspective view of the mechanism shown in FIG. 1 with portions thereof shown in detail.

Figure 1:
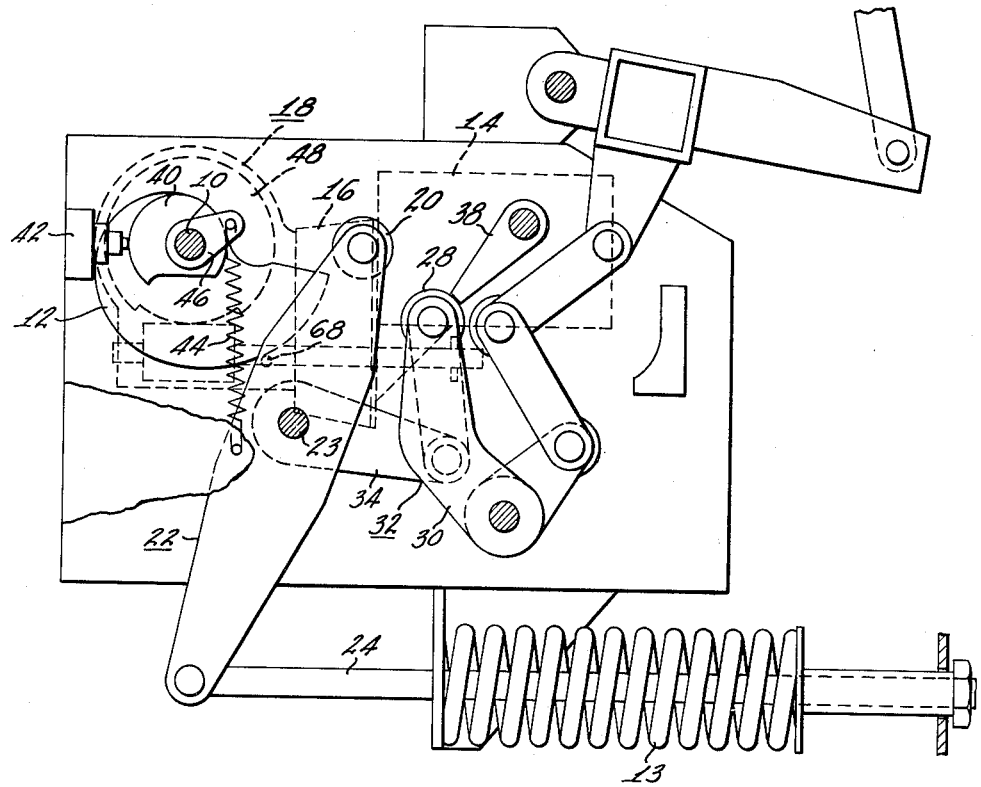
FIG. 1 is a cross sectional view of a portion of a circuit breaker operating mechanism employing the present invention.
Figure 3:
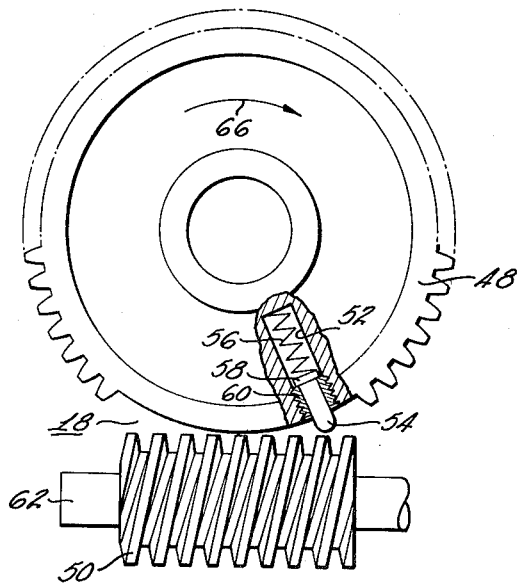
FIG. 3 is an enlarged elevational view of the transmission mechanism shown in FIGS. 1 and 2 with portions thereof broken away to show details thereof.

Referring to the drawings, FIGS. 1 and 2 show a portion of the contact operating mechanism of an electric circuit breaker incorporating the present invention. The operating mechanism comprises a drive shaft 10 which is rotatable by means of an electric motor 14 through a gear train 16 and a transmission mechanism 18, hereinafter more particularly described.

Shaft 10 is provided with means such as a cam 12 for charging a spring means 13 which is chargeable and then dischargeable, for example, to close the circuit breaker contacts. Upon clockwise rotation of cam 12, as shown in the drawings, it engages a latch roller 20 which is mounted at one end of a walking beam 22 which is pivotable about a point 23. Walking beam 22 is pivotally connected at its other end to a connecting rod 24 which is movable to the left, as shown in the drawings, upon clockwise rotation of cam means 12 when latch roller 20 is in engagement therewith. Leftward motion of connecting rod 24 compresses or loads the spring means or stored energy device 13 which is coaxially mounted around connecting rod 24.

Means are provided to latch spring 13 in charged condition. Referring to FIG. 1, a latch roll 28 is pivotally attached to the end of a link 30 of an overcenter toggle 32. The other link 34 of toggle 32 is integral with walking beam 22 and pivots with the walking beam about point 23 between the ends thereof. When spring 13 is fully charged by clockwise rotation of walking beam 22, toggle 32 is moved until latch roll 28 engages a prop latch 38 which holds the fully charged spring 13 latched in charged condition and ready to be discharged to perform a useful function such as, for example, closing of the movable contacts of the circuit breaker. Prop latch 38 may be released or tripped by means, such as a solenoid mechanism (not shown). The release of prop latch 38 permits connecting rod 24 to move to the right, as shown in the drawings. This action causes walking beam 22 to rotate counterclockwise under the force of spring means 13. Once the stored energy of spring means 13 has been released, the spring means can again be recharged automatically by motor 14, as hereinafter explained.

Means are provided for effecting energization and deenergization of motor 14.

As FIGS. 1 and 2 show, shaft 10 has a cam means 40 fixedly mounted thereon for operating a switch 42 which controls motor 14. Cam means 40 is adapted to operate switch 42 to effect energization of motor 14 when cam 12 is moved clockwise by means such as a spring 44 after spring 13 discharges to close the circuit breaker contacts. Spring 44 is connected to a lever arm 46 which is affixed to shaft 10. Cam means 40 is further adapted to operate switch 42 to effect deenergization of motor 14 when shaft 10 has nearly completed one revolution and cam 12 has caused spring 13 to be fully recharged.

In accordance with the invention, transmission mechanism 18 comprises a worm wheel gear 48 and a spiral worm 50. Worm wheel gear 48 is affixed to shaft 10 and is provided with teeth along a portion of its periphery and is further provided with another portion not having teeth. Gear 48 is provided near one end of its toothless portion with a recess 52. Means such as a plunger or detent member 54 is slidably mounted in recess 52 and biasing means such as a compression spring 56 is disposed in recess 52 between the plunger and the bottom of the recess. Spring 56 tends to move plunger 54 outwardly of recess 52. Accordingly, means such as an integrally formed shoulder 58 is provided on plunger 54 to limit the outward travel of plunger 54. Shoulder 58 cooperates with a threaded bushing 60 which is disposed in recess 52. Preferably, plunger 54 is adapted to extend outwardly to the height of the teeth on worm wheel gear 48.

Transmission mechanism 18 further comprises a shaft 62 which is understood to be connected to gear train 16. Spiral worm 50 is rigidly secured to shaft 62. The axis of shaft 62 is disposed at right angles to the axis of drive shaft 10 and is spaced apart therefrom sufficiently to permit proper engagement of the teeth on worm wheel gear 48 with the thread on spiral worm 50.

As will be apparent, rotation of worm 50 does not effect rotation of gear 48 until the gear is moved in the direction of an arrow 66 and plunger 54 is brought into engagement with the thread of spiral worm 50. Such movement is brought about by biasing spring 44 when cam 12 is unlatched from a pin 68 on beam 22. When plunger 54 comes into contact with spiral worm 50, the plunger is depressed thereby until it clears the raised portion of the thread of spiral worm and then spring 56 forces plunger 54 outwardly so that it engages the threaded groove in the spiral worm. Once in this position, continued rotation of spiral worm 50 causes plunger 54 to cam gear 48 into a position wherein its toothed portion engages the thread on spiral worm 50. Once the teeth are engaged, shaft 10 is caused to rotate.

When worm wheel gear 48 has nearly completed one rotation its teeth disengage the thread on spiral worm 50 and shaft 10 stops rotating even through spiral worm 50 and shaft 62 continue to rotate in response to motor overtravel. It is to be noted, that as the teeth reach the point of disengagement, cam 40 on shaft 10 operates switch 42 to effect deenergization of motor 14.

The circuit breaker contact operating mechanism hereinbefore described operates as follows. Assume first that its components are in the position shown in FIGS. 1 and 2, i.e., that the circuit breaker contacts (not shown) are open, that spring 13 is fully charged, that member 22 is latched in position by latch 38, that motor 14 is not energized, that detent 54 on gear 48 is not in engagement with worm 50, and that spring 44 is charged. In this condition the circuit breaker contacts (not shown) are ready, for example, to be closed upon discharge of spring 13.

When latch 38 is released, spring 13 is able to discharge and causes member 22 to move counterclockwise. As member 22 moves, stop 68 thereon frees cam 12 for clockwise movement and spring 44 biases shaft 10 clockwise. When this occurs, cam 40 operates switch 42 to start motor 14. Simultaneously, shaft 10 moves gear 48 so that detent 54 thereon engages spiral worm 50. Thus, as motor 14 turns spiral worm 50, the toothed portion of gear 48 moves into engagement with the worm and the gear is rotated clockwise. As gear 48 rotates, it causes shaft 10 to rotate and cam roller 20 rides along the cam surface of cam 12 to cause clockwise movement of member 22 and recharging of spring 13 as hereinbefore explained. When spring 13 is recharged, cam 40 operates switch 42 to deenergize motor 14. Motor 14 and worm 50 continue to rotate after the motor is deenergized but by this time gear 48 has completed one cycle and the toothed portion thereof has disengaged spiral worm 50 so that such overtravel is not transmitted to gear 48. Rotation of shaft 10 causes spring 44 to recharge and cam 12 rests against stop 68 on member 22. The mechanism is thus returned to its initial starting position.

Although the invention disclosed herein is shown as being employed with a circuit breaker operating mechanism, it is apparent that it could be employed with other apparatus.

Having now particularly described and ascertained the nature of my said invention and the manner in which it is to be performed, I declare that what I claim is:

1. In combination, a motor, a spiral worm driven by said motor, a gear driven by said worm, said gear having a toothed portion and a toothless portion and having a movable detent on said toothless portion, a support on which said gear is rotatably mounted, first and second cams connected to said gear and rotatable therewith, a lever mounted on said support and movable by said first cam, a spring on said support and movable by said lever from a discharged to a charged condition, said spring being dischargeable to move said lever to perform a function, means for releasably latching said spring in charged condition, a switch operated by said second cam for energizing and deenergizing said motor, and biasing means connected to said gear and to said support for rotating said gear so that said detent engages said worm.

2. In combination, a motor, a spiral worm driven by said motor, a gear driven by said worm, said gear having a toothed portion and a toothless portion and having a movable spring biased detent on said toothless portion, a support, a shaft rotatably mounted on said support and connected to said gear, a first cam mounted on said shaft and rotated therewith, a lever mounted on said support and movable by said first cam, a spring on said support and movable by said lever from a discharged to a charged condition, said spring being dischargeable to move said lever to perform a function, means for releasably latching said spring in charged condition, a second cam on said shaft and rotated therewith, a switch operated by said second cam for energizing and deenergizing said motor, and biasing means connected between said support and said shaft for rotating said gear so that said detent engages said worm.

3. In combination, a motor, a spiral worm driven by said motor, a gear driven by said worm, said gear having a toothed portion and a toothless portion and having a movable spring biased detent on said toothless portion, a support, a shaft rotated by said gear and mounted on said support, a first cam on said shaft and rotated therewith, a member movably mounted on said support, spring means mounted on said support and connected to said member, said member being movable from one position to another to charge said spring and said member being movable from said other position to said one position in response to discharge of said spring, means for releasably latching said member in said other position, said first cam engageable with said member to move the latter from said one position to another, a second cam on said shaft and rotated therewith, a switch for energizing and deenergizing said motor operated by said second cam, said switch effecting energization of said motor when said detent on said gear is brought into engagement with said worm, said switch effecting deenergization of said motor when said toothed portion of said gear disengages said worm, and biasing means connected between said support and said shaft for bringing said detent on said gear into engagement with said worm.

References Cited by the Examiner
UNITED STATES PATENTS

| | | | |
|---|---|---|---|
| 831,974 | 9/06 | Muller | 74—435 |
| 1,127,942 | 2/15 | Theofanidis | 74—435 |
| 3,019,309 | 1/62 | Goodwin | 200—50.15 |
| 3,021,400 | 2/62 | Goodwin | 200—50.15 |

JULIUS E. WEST, *Primary Examiner.*